CIRCULAR KNITTING MACHINES

Original Filed July 12, 1967 2 Sheets-Sheet 1

Inventor
FREDERICK HENRY CARROTTE
By
Davis, Hoxie, Faithfull & Hapgood
Attorneys

CIRCULAR KNITTING MACHINES

Original Filed July 12, 1967 2 Sheets-Sheet 2

Inventor
FREDERICK HENRY CARROTTE
By
Davis, Hoxie, Faithfull + Hapgood
Attorneys United States Patent Office Re. 27,256
Reissued Dec. 28, 1971

27,256

CIRCULAR KNITTING MACHINES

Frederick Henry Carrotte, Leicester, England, assignor to A. Kirkland & Company Limited, Syston, Leicester, Leicestershire, England Original No. 3,470,713, dated Oct. 7, 1969, Ser. No. 652,838, July 12, 1967. Application for reissue May 28, 1970, Ser. No. 41,515
Claims priority, application Great Britain, July 15, 1966, 31,912/66
Int. Cl. D04b *9/06, 9/38*
U.S. Cl. 66—25 2 Claims

Matter enclosed in heavy brackets [ ] appears in the original patent but forms no part of this reissue specification; matter printed in italics indicates the additions made by reissue.

ABSTRACT OF THE DISCLOSURE

A circular knitting machine comprising single-butt needles which cooperate with cam segments, each segment having one track permitting passage of said butts without causing needle movement and a second track for producing knitting motion of the needles. Two butts on a selector jack associated with each needle selectively cooperate with said segments for aligning said needle butts to enter the second track when desired, and a locking jack between needle and selector jack, retains the two butts in their selected condition. Two of said segments include means for releasing and re-locking the locking jacks and a setting device selects the position of said two selector jack butts of each needle whilst the locking means is released, whereby the sequence in which said two butts are set may be changed during knitting.

Figure 1:
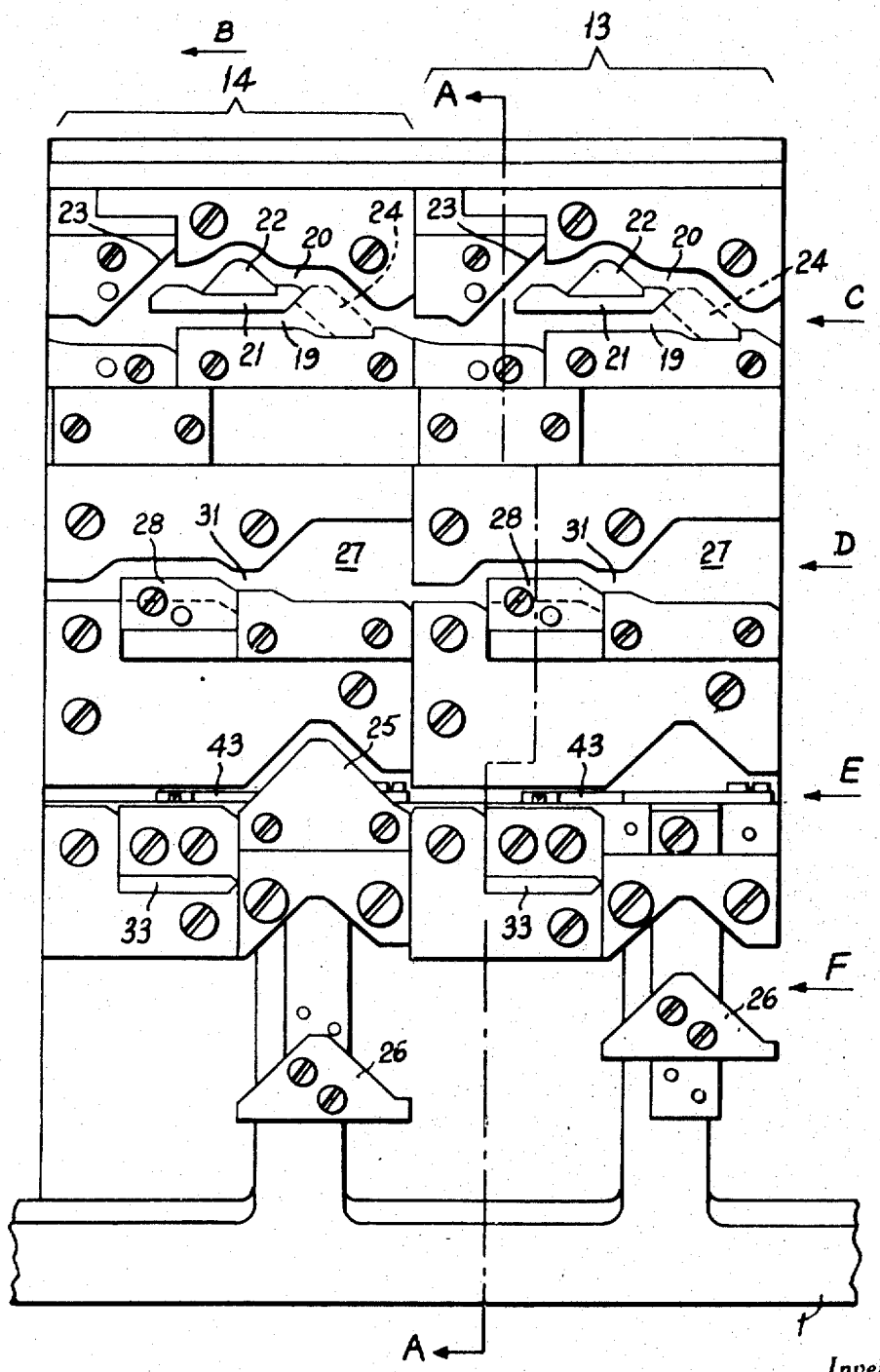

U.S. patent specification No. 3,240,032 relates to circular knitting machines of the plain or rib type having cylinder and dial needle beds and describes an arrangement whereby the machine can be caused to produce simple patterns such as stripes and checks, and the pattern to be knitted can be changed without resorting to rearrangement or replacement of needles.

In claim 1 of [said specification] *Patent 3,240,032* there is claimed a circular knitting machine having two sets of needles directed substantially radially and substantially longitudinally respectively of the machine and cam segments cooperating with each set for producing movement thereof as the machine is rotated wherein all the needles of one set are substantially identical, each having a single knitting butt, and each cam segment cooperating with the set has a first track permitting passage of the needle butts, as the machine is rotated, without causing substantial needle movement and a second track having an entrance out of line with the first track and shaped to cause knitting motion of any needle whose butt is aligned to enter its entrance as the machine is rotated, and two devices are associated with each needle, arranged for selection so that either will cooperate with complementary cam surfaces on each of the cam segments as the machine is rotated for aligning the needle butt to enter the second track when desired locking means being provided for retaining the two devices in this selected condition.

The principal object of the invention described and claimed in Patent 3,240,032 was to produce a machine in which the pattern to be knitted could be set in a single revolution of the machine, and the locking means would then retain the devices in their selected positions so that the set pattern could be knitted until it was desired to change to another pattern.

According to claim 13 of Patent 3,240,032 at least one cam segment includes a part arranged to be engaged successively by the locking means associated with each needle as the machine is rotated and capable of being set to release the locking means, thereby permitting the devices, whilst they are adjacent to that segment, to be moved between their selective conditions.

In one embodiment of the invention described in Patent 3,240,032 the two devices associated with each needle are butts on a rockable jack slidably mounted in the trick in with each needle is mounted, and the locking means is a further jack slidably mounted below each rockable jack and having a tail arranged to lie on one side or the other of a complementary tail on the rockable jack to lock the latter in its selected position. One cam segment of the machine has a cam which can be arranged to lower the locking jack to permit the rockable jack to rock, and also has provision for mounting a setting device for rocking the rockable jacks as they move past it on rotation of the machine, whilst their respective locking jacks are lowered by the cam. The rockable jacks of this machine can be set in the sequence selected by the setting device in one revolution, but the setting device described would normally have a fixed setting throughout the revolution and so would set the needles in a fixed sequence all round the machine. In the particular embodiment described the sequence was over a repeated series of four needles. With different types of setting device a longer sequence could be provided for example U.S. patent specification No. 3,263,453 describes a setting device using a punched tape or other controller to vary the setting sequence during the setting of the machine; but whatever method of setting is used, the machine will knit in exactly the same sequence at each feeder, and if the sequence is set in a single revolution and then locked the machine will knit the same sequence repeatedly, and will therefore produce only vertical stripe patterns or, with suitable, arrangement of the yarn colours or types fed to the various feeders to give also some horizontal stripes, checks.

The term "cam segment" is used in this specification to refer to all the cams in the cam box for the cylinder or for the dial of the machine which can be operated to produce movements of the needles and jacks at one yarn feeder of the machine, and is not necessarily related to the segments into which the cam boxes are divided to provide a convenient assembly.

The present invention is an improvement in or modification of the invention described and claimed in Patent 3,240,032, and provides for changing the sequence in which the two devices associated with each needle are set whilst knitting is in progress.

According to this invention in a machine as claimed in laim 13 of Patent 3,240,032 two or more cam segments ach include a release device for releasing and re-locking ıe locking means associated with each successive needle s the needles pass the cam segments during rotation of ıe machine, and a setting device is provided adjacent ach of the said two or more cam segments, capable of eing arranged to engage and select the position of the vo devices associated with each needle whilst the lock-ıg means is released.

With this arrangement the two devices associated with ach needle can be re-set at each of the said cam segments ) that the pattern to be knitted can be varied whilst knit-ng is in progress. However, if the locking [measn] *ıeans* is not released at one or more of the said cam :gments then the previous setting of the two devices will e maintained. This differs from most pattern knitting ıachines, on which each needle must be selected to per-ɔrm the desired operation at each feeder, regardless of ıe complication or simplicity of the pattern to be knitted. his selection reduces the speed at which the machines ın be operated, so that even when knitting plain fab-c or simple patterns their speed, and therefore their roduction rate, are no higher than when knitting com-licated freehand patterns. With machines incorporating ıe present invention no needle selection is necessary at ım segments in which the locking means is not released, nd the machine cam consequently run at higher speed hen knitting plain or simple patterned fabrics than when equent needle selection is required. The invention thus rovides, in a single high production machine, facilities ɔr producing plain knitting, stripes or checks, or free-and patterns and the type of knitting to be produced can e changed simply and quickly. Stripes and checks can e produced without any patterning device fitted to the ıachine in exactly the same way as in the machines de-ribed in the Patent 3,240,032.

Preferably the cam segment associated with each feeder f the machine has a release device and an associated etting device so that the two devices associated with ıch needle can be set separately for each feeder. This rangement enables the knitting sequence of the needles ) be changed for each successive feeder, enabling the ıachine to be used to knit free and patterns, that is pat-rns other than stripes or checks, with any desired pat-rn arrangement within the pattern repeat area, which is substantially rectangular area determined by the num-er of feeders on the machine and the number of possible lections provided by the setting device.

A preferred type of setting device is a pattern wheel drum. For example the machine may have a number f pattern wheels arranged as described in my U.S. Patent *o. 3,464,234 issued Sept. 2, 1969* [application Ser. No. 52,825] (filed on the same day as this present applica-ɔn). However, other mechanisms or electrically operated etting devices could be used.

Figure 2:
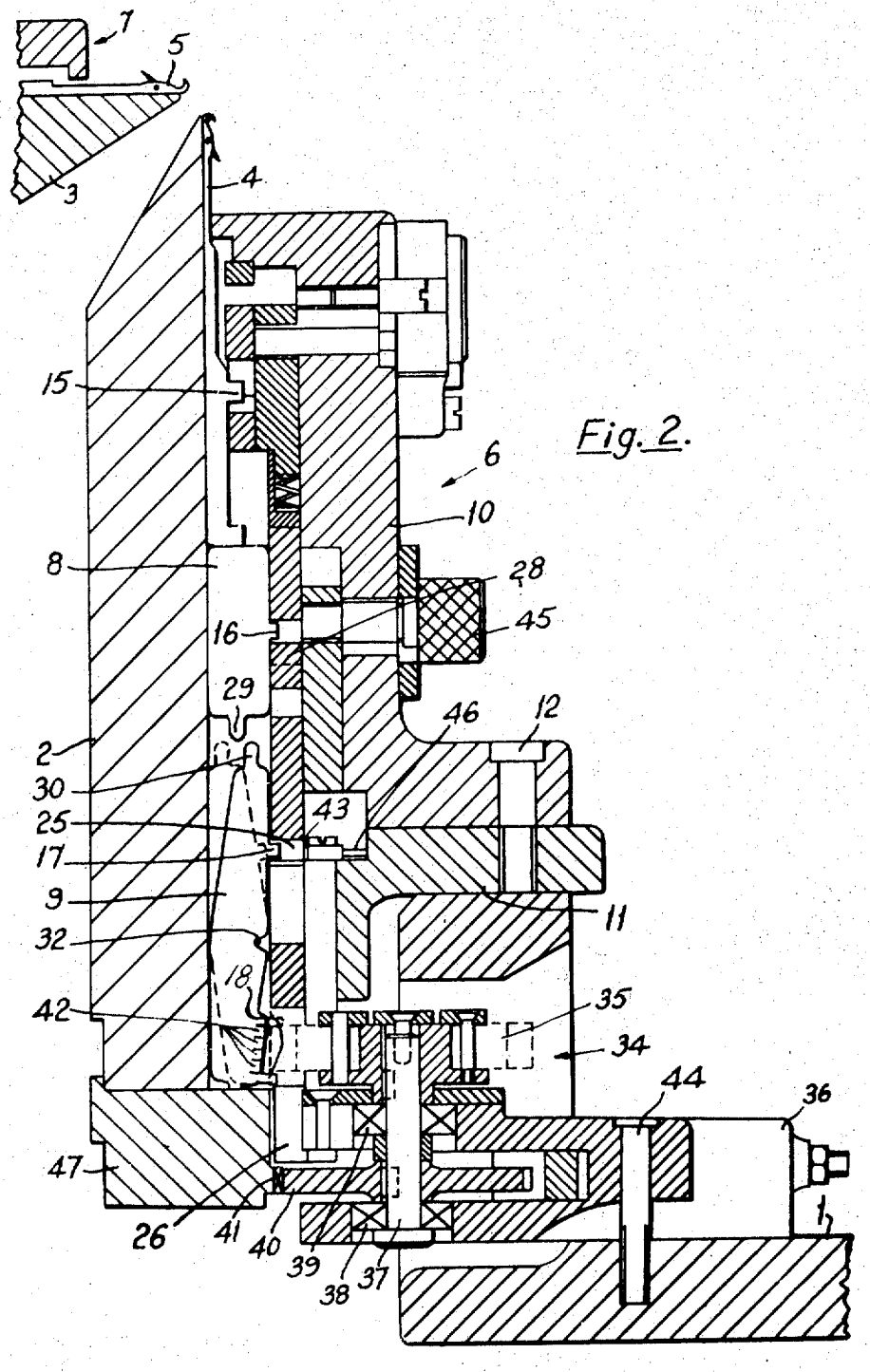

An embodiment of the invention is illustrated by way example by the accompanying drawings, in which FIGURE 1 is a developed elevation of a pair of cylin-er cam segments of a circular knitting machine, viewed om the inside, and FIGURE 2 is a sectional elevation taken on the line —A of FIGURE 1.

The knitting machine comprises a frame 1 in which is tatably mounted a cylinder 2 and a dial 3 each carrying idable needles 4, 5 respectively to co-operate with cams ounted in cam boxes 6, 7 respectively, the usual gen-al arrangement for such a machine. The dial and its edles and cam arrangement are conventional in con-ruction in this machine and will not be further de-ribed, but it will be understood that the dial could be ovided with patterning arrangements similar to those hich will now be described with reference to the cylin-r and its associated cams.

The cylinder needles 4 are slidably mounted in tricks in the outer wall of the cylinder, and below each needle, slidably mounted in the trick is a locking jack 8 and a rockable selector jack 9. The cam boxes 6 are secured to the frame 1 and for convenience the cylinder cam box is formed in segmental pieces each carrying the cams to cause the needles to perform the desired knitting sequence at two feeders. As mentioned, the term "cam segment" is used herein to refer to all the cams associated with one feeder. Thus FIGURE 1 shows two cam segments, the cams all being mounted on two segmental cam box pieces 10, 11 secured together by bolts 12.

Referring to FIGURE 1, in which two cam segments 13, 14 are shown, the arrangement of the cams in each segment provides cam tracks at four levels C, D, E and F, the track at level C co-operating with butts 15 on the needles 4, the track at level D co-operating with butts 16 on the locking jacks 8 and the tracks at levels E and F co-operating respectively with upper and lower butts 17, 18 on the rockable selector jacks 9. The machine is rotated in an anticlockwise direction viewed from above, the various butts traveling from right to left with respect to the cams shown in FIGURE 1, in the direction of the arrow B.

The cam track at level C provides two alternative paths 19, 20 for the needle butts 15, separated by a divider cam 21. The path 19 is horizontal at the level C, and needles which follow this path in any segment will miss knitting at the feeder associated with that segment. Needles which are caused to enter the path 20 may be raised by clearing cams 22 to cause them to clear their loops and pick up the yarn at the respective feeder, or if the cams 22, which are radially slidable, are withdrawn from the track the needles will be raised only to the height of the top of the divider cam 21 and will pick up yarn at the feeder but not clear their loops, so forming a tuck stitch. After passing the divider and clearing cams, needles which have entered the path 20 will be lowered by a stitch cam 23 to form their new loops.

Needles may be caused to enter the path 20 by radially slidable bolt cams 24, but if these cams are in position the path 19 will not be available and the machine will operate as a simple plain machine. For producing any kind of patterned fabric these cams 24 will be withdrawn from the tracks, and the remainder of the description concerns operation of the machine when the cams 24 are so withdrawn. In this case needles can be raised to cause them to enter the track 20 by the inclusion of raising cams 25, 26 in the tracks at levels E and F, to operate on the butts 17, and it is only in respect of these cams 25 and 26 that the two cam segments 13 and 14 differ. The cam segment 13 has no cam 25 at level E so that rockable jacks 9 which are in the position shown in full line in FIGURE 2 (in which their upper butts 17 are positioned to engage the cams but their lower butts 18 are moved clear of the cams) will pass by this cam segment without raising their respective needles, the butts 15 of which will therefore pass through the path 19. At level F however, the cam segment 13 has a cam 26 positioned to engage and raise the lower butts 18 of any rockable jacks 9 which are in the alternative position shown in dotted line in FIGURE 2. This raising of the rockable jacks 9 will raise their respective needles 4, through the intermediary of the locking jacks 8, and cause the needle butts 15 to enter the path 20, so that those needles will knit or tuck according to the position of the clearing cam 22.

The cam segment 14, on the other hand, has a raising cam 25 on the track at level E to engage and raise the upper butts 17 of rockable jacks 9 in the full line position, but the cam 26 in this case is mounted below the level F and therefore the lower butts 18 of rockable jacks 9 in the dotted line position will pass by without being raised.

This arrangement of raising cams 25 and 26 at levels E and F in alternate segments provides that when the rockable jacks 9 are selected for a particular knitting sequence at cam segments similar to segment 13 they will automatically be selected for the opposite sequence at the alternate cam segments similar to cam segment 14, which for many patterns has the advantage that setting devices are required only on every other cam segment. However, it will be understood that the segments can be provided with raising cams 25 or 26 at levels E and F in any desired order around the machine.

The track at level D is for the first part 27 of width sufficient to allow whatever movement of the butts 16 of the locking jacks is dictated by the cams 25 or 26 operating on the rockable jacks. In the second part of the track at this level in each of the cam segments 13 and 14 is mounted a releasing cam 28 to engage the butts 16 and raise the locking jacks 8 sufficiently to clear their tails 29 for the complementary tails 30 of the rockable jacks 9, thereby permitting the latter to rock if it is desired to change their positions. Prior to striking the releasing cams 28 the butts 16 of the locking jacks 8 enter a narrow part 31 of the track at level D, which aligns notches 32 of the rockable jacks 9 with part cylindrical pivots 33 mounted below the releasing cams 28 in each segment. These pivots 33 locate the rockable jacks during rocking movement which may be produced by a setting device 34 as will be described. The cams 28 thus release each locking jack 8 from its complementary rockable jack 9 as the jacks move successively past the cam segments. However, if it is not desired to change the setting of the rockable jacks at any segment then the releasing cam 28 in that segment will be lowered to a position shown in dotted lines so that the butts 16 of the locking cams will pass straight through at level D, keeping the position of the rockable jacks 9 locked.

The preferred setting device 34 for determining the positions of the rockable jacks 9 is a pattern wheel or a number of superimposed pattern wheels. In FIGURE 2 of the drawings a pattern wheel 35 is shown, rotatably mounted on a spindle 37 mounted in bearings 38, 39 on a bracket 36 secured to the frame 1 of the machine and driven by a pinion 40 on the spindle 37 engaging complementary teeth 41 around the periphery of a ring 47 secured to the cylinder 2. The pattern wheel 35 in fact comprises superimposed discs having teeth to co-operate with butts at four levels on the rockable jacks 9 above the lower butts 18 as indicated at 42 in FIGURE 2, in the same manner as the butts 24 of the rockable jacks 4 described in Patent 3,240,032. There could of course be more or less than four levels of butts and a complementary number of discs on the pattern wheel 35, and for the purpose of this description the pattern wheel 35 will be regarded as a single wheel which may have teeth around its circumference with the same spacing as the needles and jacks around the cylinder 2, and the butts 42 will be regarded as a single butt. The teeth of the pattern wheel are provided at positions in which it is desired that the rockable jacks will be moved to their full line position and teeth are removed at positions in which the jacks are required to be in their dotted line position. When a cam segment includes a releasing cam 28 and setting device 34 there is also included a tapering cam 43 in the track at level E, circumferentially in advance of the position at which the pattern wheel 35 is to operate on the butts 42 but positioned to strike the butts 17 of the rockable jacks 9 after the butts 16 of the locking jacks 8 have been raised by the cams 28 to release the rockable jacks. These tapering cams 43 are shaped to engage the butts 17 and move them inwardly, thus moving each successive rockable jack 9, after it has been released, to the position shown in dotted lines. Immediately after this, those rockable jacks which are desired to be set in the opposite position are engaged by teeth suitably positioned on the pattern wheel 35 and moved into the full line position. There is thus provided on each of the two cam segments shown means for setting each rockable jack 9 into one or other of its positions, and it will be appreciated from the disposition of the cams that the selection made on each segment determines the knitting action to take place at the next segment, after which the rockable jacks 9 may or may not be re-set according to whether or not the next cam segment has its releasing cam 28 raised or lowered. The provision of a number of superimposed discs in the wheel and a number of butts at the positions 42 simply increases the number of possible selections of positions of the rockable jacks 9.

If it is desired to change the pattern to be knitted by the machine the setting device 34 [of] *on* any segment may be withdrawn by releasing a bolt 44 and the pattern wheel 35 may be removed and replaced by another. The setting device can in fact be removed altogether if it is not desired to make any setting at that cam segment, and in this case the releasing cam 28 will be lowered by means of a control knob 45 so that the rockable jacks will not be released at that segment and the tapering cam 43, which is pivotally mounted, will be swung into the cam box piece 11, by means of a rod 46, so as to clear the butts 17 of any rockable jacks 9 which are in the full line position. The machine can thus be operated with setting devices 34 on any number of its cam segments from one to the total number present and in fact for knitting plain fabric or simple patterns, once all the rockable jacks 9 have been set they can be locked and no setting devices are then required, the machine then operating in a similar manner to the machine described in Patent 3,240,032. By raising the releasing cam 28 and mounting pattern wheels on the machine however it can quickly be converted to knit a freehand pattern, or any other desired pattern.

I claim:

1. In a circular knitting machine of the kind having two sets of needles directed substantially radially and substantially longitudinally respectively of the machine and cam segments cooperating with each set for producing movement thereof as the machine is rotated, wherein all the needles of one set are substantially identical, each having a single knitting butt, and each cam segment cooperating with this set of needles has a first track permitting passage of the needle butts as the machine is rotated without causing substantial needle movement, and a second track having an entrance out of line with the first track and shaped to cause knitting motion of any needle whose butt is aligned to enter its entrance as the machine is rotated, the improvement comprising a selector jack associated with each needle, two butts on each selector jack arranged for selection so that either will cooperate with complementary cam surfaces on each of the cam segments as the machine is rotated and will serve to align the butt of the associated needle to enter the said second track, a locking jack associated with each selector jack and located between the selector jack and its needle, each locking jack being arranged to cooperate with its associated selector jack to lock the selector jack in either of two positions, at least two cam segments including a release device for releasing and relocking the selector jacks in relation to their locking jacks as the jacks pass the cam segments during rotation of the machine, and a setting device located adjacent each of said cam segments capable of being arranged to engage and select the position of each selector jack while the locking means is released.

*2. In circular knitting machines having at least one set of needles and cam segments cooperating with the said needles for producing movement thereof as the machine is rotated, each of the said cam segments having a first track permitting passage of the needle butts as the machine is rotated without causing substantial needle movement, and a second track having an entrance out of line with the first track and shaped to cause knitting motion*

*f any needle whose butt is aligned to enter its entrance s the machine is rotated, the improvement comprising a ockable jack associated with each needle, two butts on ach rockable jack arranged for selection so that either ill cooperate with complementary cam surfaces on each f the cam segments as the machine is rotated and will erve to align the butt of the associated needle to enter ie said second track, a locking jack associated with each ockable jack and located between the rockable jack and s needle, each locking jack being arranged to cooper- te with its associated rockable jack to lock the rockable ick in either of two positions, at least two cam segments icluding a release device for releasing and relocking the ockable jacks in relation to their locking jacks as the icks pass the release device during rotation of the ma- hine, and a setting device located adjacent each of said im segments capable of being arranged to engage and elect the position of each rockable jack while the rockable ick is released.*

References Cited

The following references, cited by the Examiner, are of record in the patented file of this patent or the original patent.

UNITED STATES PATENTS

| | | | |
|---|---|---|---|
| 2,019,396 | 10/1935 | Deans et al. | 66—50 B |
| 3,240,032 | 3/1966 | Carrotte | 66—50 R X |
| 3,263,453 | 8/1966 | Carrotte et al. | 66—50 R |
| 3,315,494 | 4/1967 | Farmer | 66—50 |
| 2,764,006 | 9/1956 | Lawson et al. | 66—25 |

FOREIGN PATENTS

| | | | |
|---|---|---|---|
| 1,449,339 | 7/1966 | France | 66—50 |
| 1,005,516 | 9/1965 | Great Britain | 66—50 |
| 1,005,522 | 9/1965 | Great Britain | 66—50 |
| 1,116,744 | 6/1968 | Great Britain | 66—50 |

WM. CARTER REYNOLDS, Primary Examiner